(12) United States Patent
Axelrod et al.

(10) Patent No.: US 7,617,729 B2
(45) Date of Patent: Nov. 17, 2009

(54) ACCELEROMETER

(75) Inventors: Noel Axelrod, Jerusalem (IL); Eran Ofek, Modi'in (IL)

(73) Assignee: Physical Logic AG, Zug (CH)

(*) Notice: Subject to any disclaimer, the term of this patent is extended or adjusted under 35 U.S.C. 154(b) by 388 days.

(21) Appl. No.: 11/674,951

(22) Filed: Feb. 14, 2007

(65) Prior Publication Data

US 2007/0193355 A1    Aug. 23, 2007

Related U.S. Application Data

(60) Provisional application No. 60/775,530, filed on Feb. 21, 2006.

(51) Int. Cl.
*G01P 15/125*    (2006.01)
(52) U.S. Cl. .................................................. 73/514.32
(58) Field of Classification Search ............. 73/514.32, 73/504.12; 361/280
See application file for complete search history.

(56) References Cited

U.S. PATENT DOCUMENTS

| | | | |
|---|---|---|---|
| 5,447,067 A | 9/1995 | Biebl | |
| 5,447,068 A | 9/1995 | Tang | |
| 5,627,317 A | 5/1997 | Offenberg et al. | |
| 6,122,962 A * | 9/2000 | Yoshino et al. | 73/504.14 |
| 6,199,874 B1 | 3/2001 | Galvin et al. | |
| 6,291,875 B1 * | 9/2001 | Clark et al. | 257/622 |
| 6,296,779 B1 | 10/2001 | Clark et al. | |
| 6,705,166 B2 | 3/2004 | Leonardson | |
| 6,860,151 B2 | 3/2005 | Platt | |
| 6,868,726 B2 * | 3/2005 | Lemkin et al. | 73/514.32 |
| 6,892,576 B2 | 5/2005 | Samuels | |
| 6,990,864 B2 | 1/2006 | Sakai | |
| 7,004,024 B1 | 2/2006 | Park | |
| 7,013,730 B2 | 3/2006 | Malametz | |
| 7,024,933 B2 | 4/2006 | Malametz | |
| 7,107,846 B2 | 9/2006 | Kano | |
| 7,109,727 B2 | 9/2006 | Hayakawa | |
| 7,337,671 B2 * | 3/2008 | Ayazi et al. | 73/514.32 |

OTHER PUBLICATIONS

Hypungho Ko et al., "High Performance Microaccelerometer with Wafer-level Hermetic Packaged Sensing Element and Continuous-time BiCMOS Interface Circuit", Journal of Physics: Conference Series 34, pp. 1002-1007, 2006.

Lemkin, Mark A. et al., "A 3-Axis Surface Micromachined SD Accelerometer", ISSCC 1997.

Navid Yazdi et al., "Micromachined Inertial Sensors", Proceedings of the IEEE, vol. 86, No. 8, Aug. 1998.

Xuesong Jiang et al., "An Integrated Surface Micromachined Capacitive Lateral Accelerometer With 2ug/sqrt. Hz Resolution", Solid-State Sensor, Actuator and Microsystems Workshop, 2002.

(Continued)

*Primary Examiner*—John E Chapman
(74) *Attorney, Agent, or Firm*—Edward S. Sherman

(57) ABSTRACT

An accelerometer is fabricated as a MEMS device and includes an array of capacitive electrode plates mechanically coupled to a common proof mass.

The proof mass is constrained to move or vibrate in the plane parallel to the first array of plates. The capacitance between the first array of plates is measured with respect to additional arrays of capacitive plates inter-digitated in a comb like pattern.

11 Claims, 13 Drawing Sheets

OTHER PUBLICATIONS

Lemkin Mark et al., "A Three-Axis Micromachined Accelerometer with a CMOS Position-Sense Interface and Digital Offset-Trim Electronics", IEEE Journal of Solid-State Circuits, vol. 34, No. 4, Apr. 1999.

Gang Zhang et al., "A Lateral Capacitive CMOS Accelerometer With Structural Curl Compensation", Department of Electrical and Computer Engineering, The Robotics Institute, Carnegie Mellon University, Pittsburgh, PA 15213-3890.

* cited by examiner

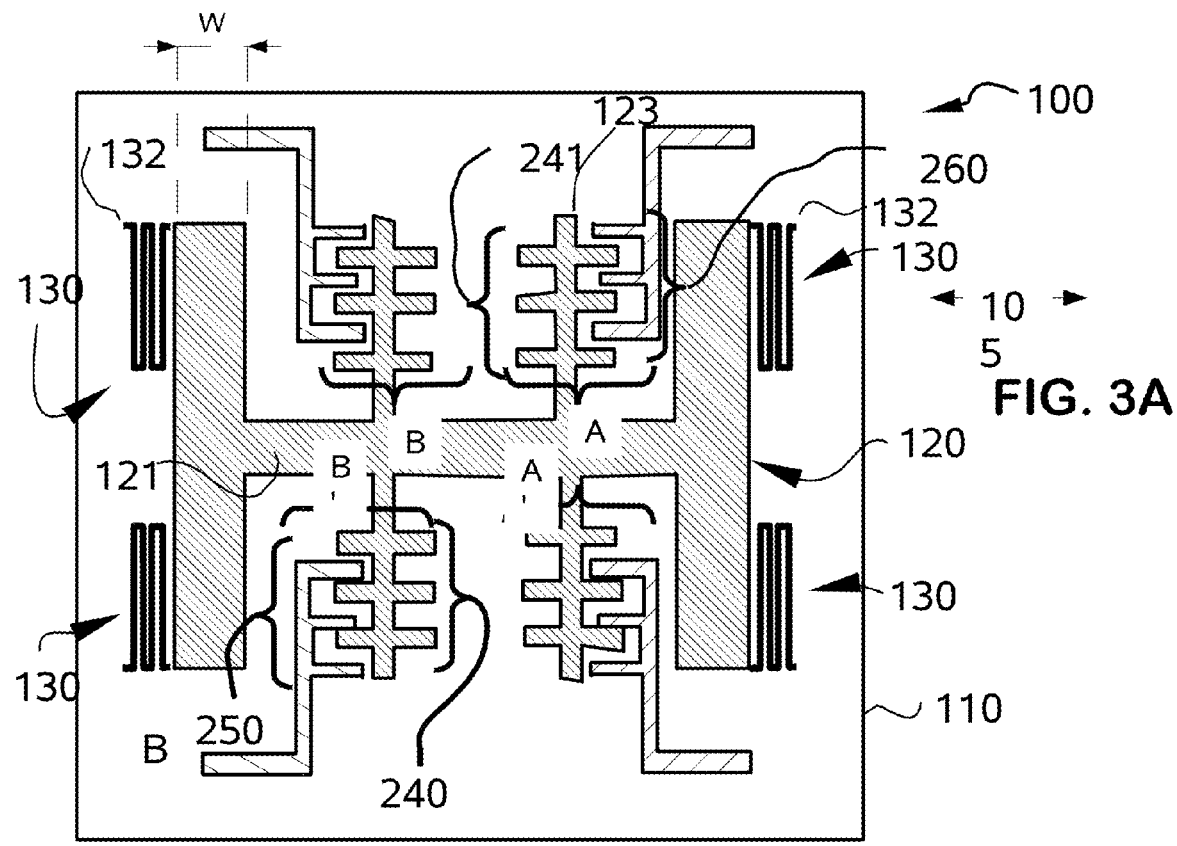
FIG. 3A
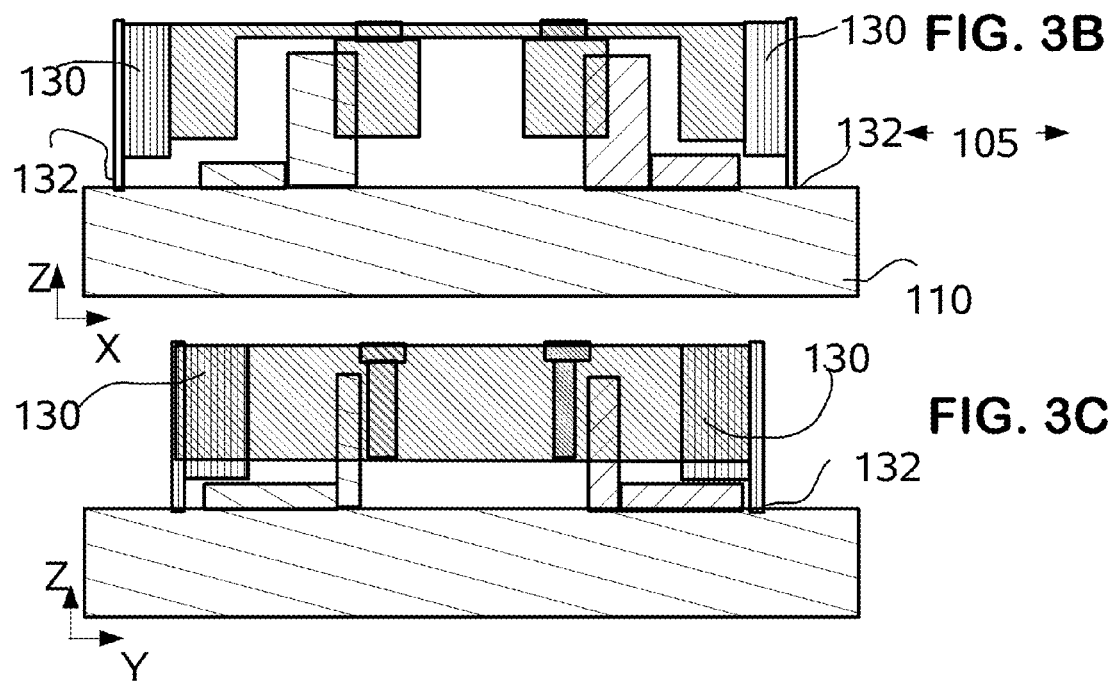
FIG. 3B
FIG. 3C

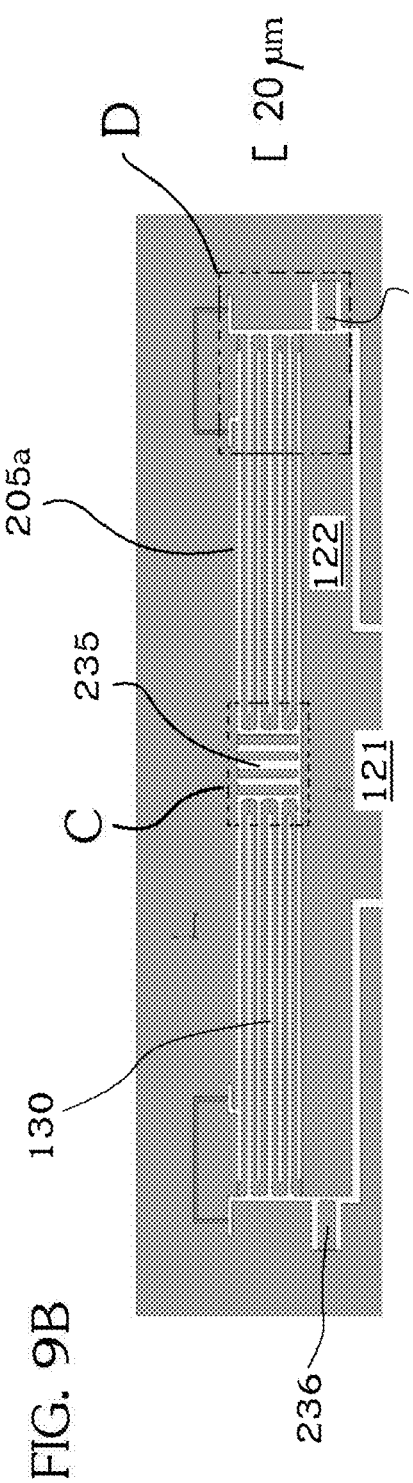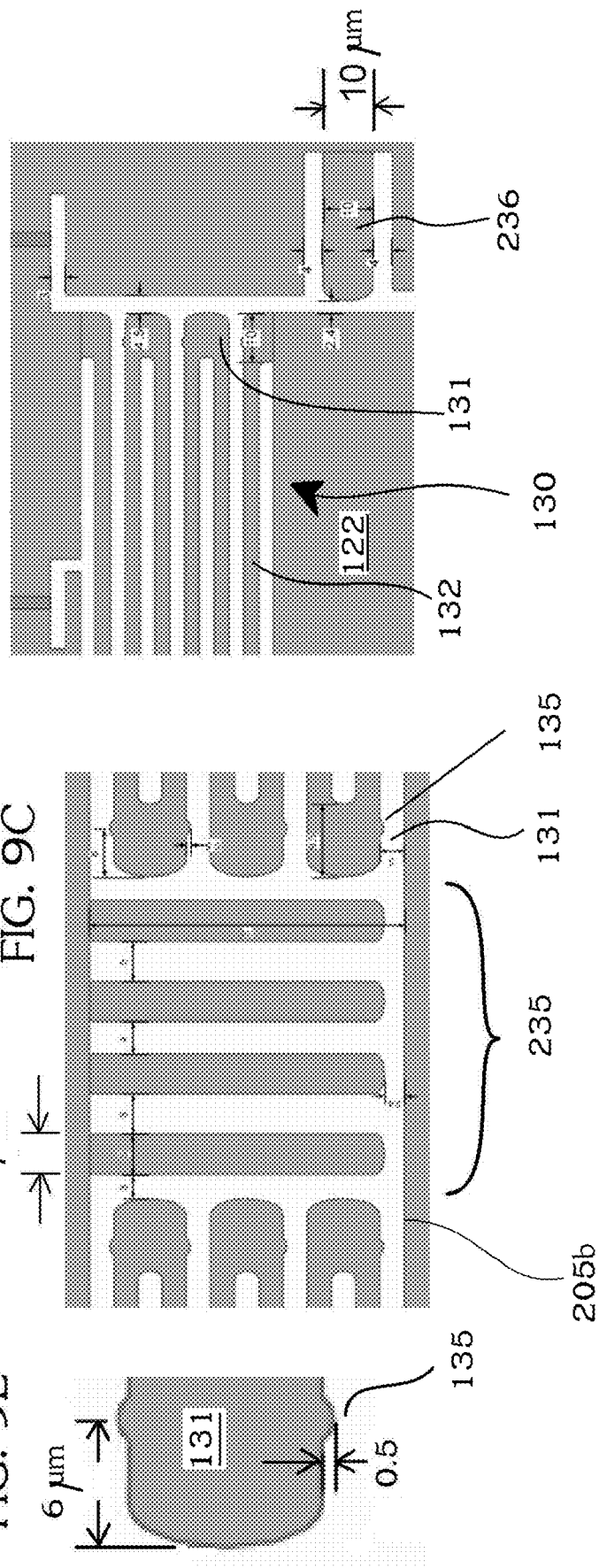

ACCELEROMETER

CROSS REFERENCE TO RELATED APPLICATIONS

The present application claims priority to the U.S. Provisional Patent Application filed on Feb. 21, 2006, entitled "Accelerometer" and having Ser. No. 60/775,530.

BACKGROUND OF INVENTION

The present invention relates to micro-mechanical electrical systems (MEMS) type device for measuring vibration and movement, and more particularly to a MEMS accelerometer.

MEMS type devices for use as sensors and accelerometers are well known. Such devices are generally fabricated on a silicon or related planar substrate by semi-conductor manufacturing type methods, such as the use of photoresists, masks and various etching processes to fabricate a proximity sensor that includes a suspended proof mass member and means to measure the deflection of the proof mass suspending means. Such devices have inherent limitations on the minimum size, detection limit, sensitivity and the like, largely due to the means used for detecting the deflection of the proof mass.

In particular, as attempts have been made to miniaturize accelerometer devices for diverse applications using the technology prior to this applicants invention important aspects of performance have been compromised. In particular, it has been difficult for the prior art devices to achieve both a low noise floor and the required capacitive sensitivity.

Although accelerometers with a noise floor of less than 1 $\mu g/\sqrt{Hz}$ have been reported they include a very large proof mass in the order of several square millimeters. In particular, there has been an unmet need for accelerometer devices with a size of less than about 1.5×1.5 mm, and more preferably less than about 1 mm×1 mm.

It is therefore a first object of the present invention to provide an accelerometer with a reduced minimum detection limit.

It is another object of the invention to provide an accelerometer with smaller physical dimensions than the prior art.

It is still a further object to provide an accelerometer having the above attributes with a higher sensitivity.

It is also an object of the invention to provide an accelerometer subject to lower mechanical noise.

A still further and additional object of the invention is to provide the aforementioned benefits in an accelerometer that can be fabricated using standard silicon on insulator (SOI) fabrication techniques generally known in he semiconductor industry to reduce manufacturing costs.

It is still a further object of the invention to provide a means to combine multiple accelerometers in a configuration for the simultaneous measurement acceleration in three dimensions.

It is still a further object of the invention to provide an accelerometer which doesn't require vacuum packaging in order to operate, thus enabling the benefits of lower packaging costs, smaller packaging size and stability of operation.

SUMMARY OF INVENTION

In the present invention, the first object is achieved by fabricating on a substantially planar substrate a proof mass frame supported on the substrate by a plurality of planar spring elements. A one or more capacitive plates is attached to and distributed with the proof mass frame while two or more arrays of capacitive plates are supported on the substrate in a cooperative inter-digitated comb like orientation. The capacitive plates are arranged with respect to the proof mass frame such that the movement of the frames permitted by the planar spring causes a change in the overlap area between stationary and moving electrodes.

A second aspect of the invention is characterized in that the capacitive plates are arrayed in a manner that capacitive plates disposed on opposite sides of the plates in a first array are connected to opposite poles of a power supply to form a differential circuit for eliminating noise.

A third aspect of the invention is characterized in the arrays of capacitive plates connected to opposite poles of a power supply that are separately and remotely inter-digitated with the capacitive plates in the first array to facilitate fabricating a MEMS device with electrical isolation between each of the arrays connected to opposite poles of the power supply.

An additional aspect of the invention is the processing of the SOI wafer from two sides resulting in an increased mass of the rotor (moving part). This facilitates in increasing the capacitive sensitivity and decreases the thermo-dynamical noise.

The above and other objects, effects, features, and advantages of the present invention will become more apparent from the following description of the embodiments thereof taken in conjunction with the accompanying drawings.

BRIEF DESCRIPTION OF DRAWINGS

FIG. 3A is a plan view of an alternative embodiment of the operative accelerometer deploying an array of capacitive plates and planar springs.

FIG. 3B is a cross section elevation of the portion of the accelerometer shown in FIG. 3A at section line B-B.

FIG. 3C is a projection though the elevation orthogonal to that shown in FIG. 3B.

FIG. 9B is an enlarged partial view of the lower spring portion of the accelerometer shown in FIG. 9A.

FIG. 9C is an enlarged partial view of the central portion of the spring portion shown 9B.

FIG. 9D is an enlarged partial view of the right most portion of the spring portion shown 9B.

FIG. 9E is an enlarged partial view of the right most portion a single spring fold shown in FIG. 9D.

DETAILED DESCRIPTION

Figure 1:
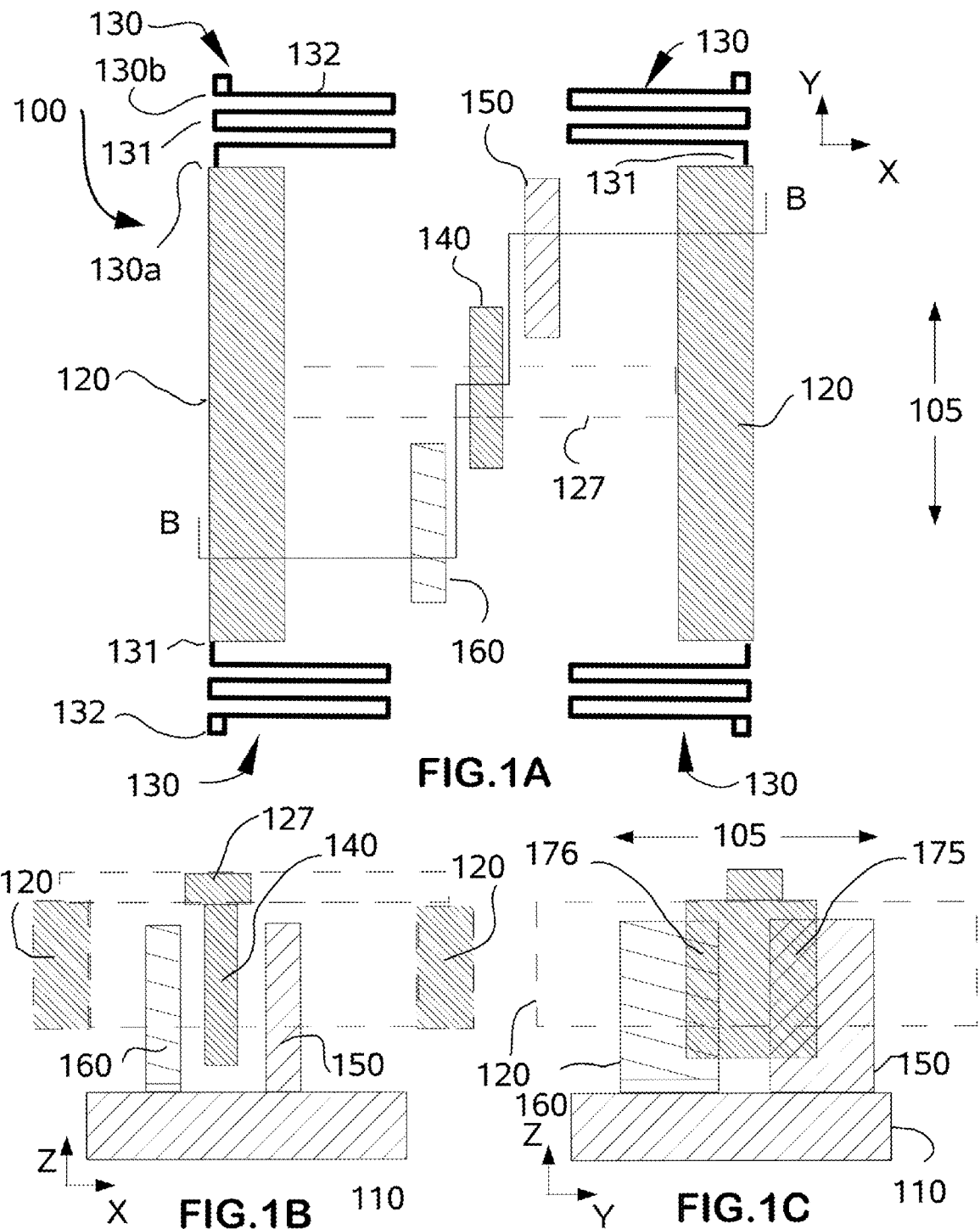
FIG. 1A is a plan view of a portion of an operative accelerometer.
FIG. 1B is a cross section elevation of the portion of the accelerometer shown in FIG. 1A at section line B-B.
FIG. 1C is a projection though the elevation orthogonal to that shown in FIG. 1B.

Referring to FIGS. 1 through 12, wherein like reference numerals refer to like components in the various views, there is illustrated therein a new and improved accelerometer, generally denominated 100 herein.

In accordance with the present invention, the operative principles will first be illustrated with reference to FIG. 1, which illustrates a portion of the operative accelerometer 100 that includes a substrate 110 which supports a pair of capacitive plates 160 and 150 that extend upward therefrom. As will be illustrated in other embodiments, the capacitive plates can be connected to the substrate in alternative configurations, provided that in general they are disposed orthogonal to the plane of the substrate. Generally, capacitive plates 160 and 150 are electrically isolated from each other, as shown in the circuit diagram 200 of FIG. 2. A third capacitive plate 140 is suspended above the substrate 110 in a parallel orientation between capacitive plates 150 and 160 by a proof mass frame 120, via bridge 127. The proof mass frame 120 is attached to and supported above substrate 110 by planar springs. The planar spring 130 is preferably a leaf spring having multiple junctions with a plurality of planar segments that lie perpendicular to the substrate 110. Preferably as shown, four planar leaf springs 130 are distributed at corners of the proof mass frame 120, being coupled thereto at junctions 130a. The opposite end 130b of each leaf spring 130 is a post that extends downward to connect with the substrate. Thus, each of the parallel or straight segment 132 of each leaf spring are free to move due to flexure at the interconnecting folds or joints 131. Arrow 105 shows the direction of movement of the proof mass frame 120 as permitted by planar springs 130.

The planar springs 130 confine the movement of proof mass frame 120 to the direction of Arrow 105 such that as the proof mass frame moves or vibrates above the substrate the capacitive plate 140 move between and parallel to the surrounding capacitive plates 150 and 160 disposed on opposite and generally diagonal sides thereof.

Figure 2:
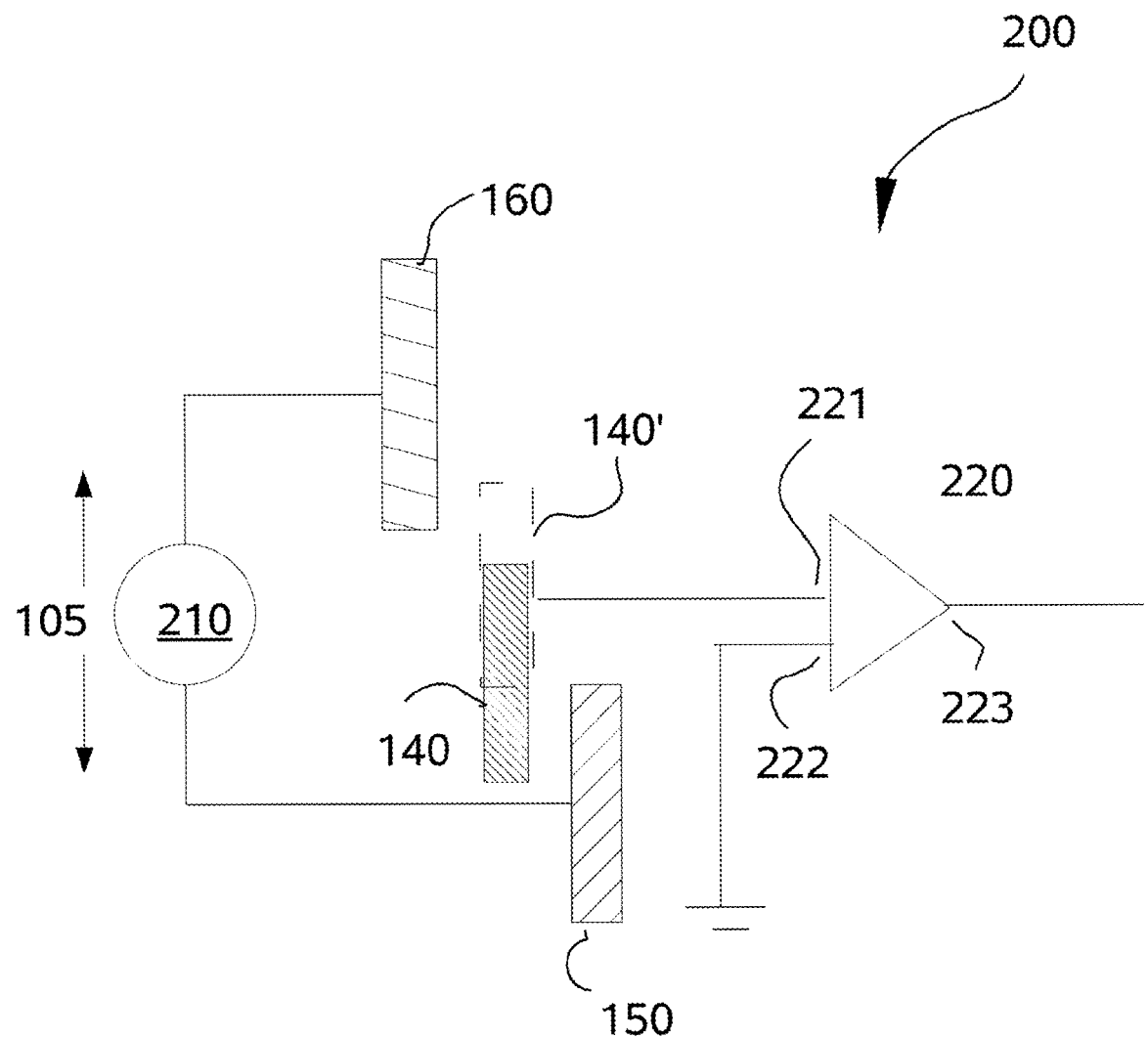
FIG. 2 is schematic illustration showing a preferred circuit diagram for use with the accelerometer of FIG. 1.

Thus, the acceleration of proof mass 120 urges the movement of capacitive plate 140 with respect to the adjacent capacitive plates 150 and 160 such that the degree of movement of proof mass 120 can be determined by the change in capacitance or charge in the operative circuit 200 of FIG. 2.

The change in capacitance with respect to plates 150 and 160 is best understood with respect to FIG. 1C, which is a projection showing both plates. The projected overlapping area of plates 140 and 150 is labeled 175, whereas the overlapping area of plates 140 and 160 is labeled 176. It show be appreciated that as proof mass moves upward with respect to arrow 105 in FIG. 1A, overlapping area 175 increases, while overlapping area 176 decreases. In contrast, when proof mass moves downward with respect to arrow 105 in FIG. 1A, overlapping area 175 decreases, while overlapping area 176 increases.

While FIGS. 1 and 2 illustrate an accelerometer deploying three capacitive plates 140, 150 and 160 it should be appreciated that in preferred embodiments, such as will be further discussed with respect to FIG. 3, each capacitive plate is replaced with one or more parallel arrays of capacitive plates. However, although the various embodiments illustrate one capacitive plate (or an array of capacitive plates is attached to the proof mass) with the other two capacitive plates (or arrays of capacitive plates) are attached to the substrate it should also be appreciated that the same relative motion between capacitive plates can be achieved in the opposite configuration, e.g., with one capacitive plate (or array of capacitive plates) attached to the substrate, while the other two (or arrays of two) capacitive plates are attached to the proof mass.

A preferred operative electrical circuit 200 for the device 100 of FIG. 1 is shown in FIG. 2. Capacitive plate 140 (or the array 240 shown in FIG. 3) that moves with respect to the substrate 110 is connected to one input terminal 221 of amplifier 220. The other input terminal 222 of amplifier 220 is grounded. Each of the adjacent fixed capacitive plates 160 and 150 (or arrays 250 and 260 shown in FIG. 3) that interact with capacitive plate 140 are connected to opposite polarity terminals of the DC power supply 210. Amplifier 220 has an output terminal 223.

When the moving capacitive plate 140 is in nominal position 140' shown in FIG. 2, the electrostatic charging from each of the oppositely charged plates 160 and 150 are balanced, hence no current flows to amplifier 220, resulting in zero output at terminal 223. However, as the plate 140 moves downward as shown in the Figure, the induced charge of the upper capacitor plate 160 decrease while the opposite induced charge from capacitor plate 150 increase, resulting in a unbalanced charge to plate 140. The changing charge balance now causes current to flow to amplifier 220 resulting in a measurable voltage change at terminal 223.

It should be appreciated that the method of sensing the movement of proof mass 120 by measuring the change in capacitance between plates 140, 150 and 160 has numerous advantages. Such a system of the capacitor electrodes (both proof mass and stationary electrodes) can be viewed as a system of parallel-connected plate capacitors.

The capacitance of each pair of electrodes is $$C = \frac{\varepsilon_0 A}{h} \tag{1}$$

Where $\varepsilon_0$ is the vacuum dielectric permittivity, A is the area of the capacitor plates and h is the distance between the plates. When the proof mass moves, the capacitance between the electrodes changes, the capacitance sensitivity $\Gamma_C$ is defined as the capacitance change per g of acceleration.

$$\Gamma_C = \frac{\partial C}{\partial a} = \frac{\partial C}{\partial x}\frac{\partial x}{\partial a} = \frac{\partial C}{\partial x}\frac{g}{\omega_0^2}, \tag{2}$$

where a is acceleration, x is displacement and $\omega_0$ is eigenfrequency of the accelerometer that is assumed to be far above the accelerometer bandwidth. (It is usually expressed in pF/g units)

In contrast to the current invention, air gap accelerometer relies on the change in the distance h between to parallel and facing electrodes that overlap in projected area, in such an air gap accelerometer the capacitive sensitivity is $$\Gamma_{C_\perp} = \left|\frac{\partial C}{\partial h}\right|\frac{g}{\omega_0^2} = \frac{C}{h}\frac{g}{\omega_0^2} \qquad (3)$$

The mechanical noises of the novel area change accelerometer will now be compared with that for the conventional air gap type device. The Brownian equivalent of acceleration noise in $g/\sqrt{Hz}$ is $$g_{n,B} = \frac{\sqrt{4K_BTD}}{Mg}, \qquad (5)$$

where D is the damping coefficient of proof mass M. The damping coefficient for two moving area-changed electrodes, such as is shown in FIG. 1-4, is $$D_1 = \eta_0 \frac{A_1}{h}, \qquad (6)$$

where $\eta_0 = 22.6 \times 10^{-6}$ Ns/m$^2$ is the viscosity of the air, $A_1$ is the plate area, h is the air gap.

The damping coefficient for two moving air-gap changed electrodes can be calculated analytically for a limited case of elongated rectangular electrodes for which h<<b<<L $$D_\perp = \eta_{\mathit{eff}} \frac{b^3 L}{h^3} \qquad (7)$$

where b is the width, L is the length of the electrodes and $\eta_{\mathit{eff}}$ is the effective gas viscosity that depends on the gas pressure and the distance between the electrodes h. For example, if h=2 μm then $\eta_{\mathit{eff}} \approx 0.83\eta_0$ at the normal pressure. The Eq. (7) could be obtained by integration of the Incompressible Navier-Stocks equation with appropriate boundary conditions.

We will now compare the damping coefficients of the area-changed and air gap accelerometers that have the same capacitive sensitivity.

Assume that the area-changed accelerometer has $N_1$ rectangular fingers with width $b_1$, length $L_1$ and distance between the electrodes h and that the air-gap accelerometer has $N_2$ rectangular fingers with width $b_2$, length $L_2$ and the same distance between the electrodes h From Eq (4) the total capacitive sensitivity of the area-changed accelerometer is $$\Gamma_1 = N_1 \frac{\varepsilon_0 L_1}{h} \frac{g}{\omega_0^2}$$

From Eq (3) the total capacitive sensitivity of the gap-change accelerometer is $$\Gamma_2 = N_2 \frac{\varepsilon_0 b_2 L_2}{h^2} \frac{g}{\omega_0^2}$$

Equalizing $\Gamma_1$ and $\Gamma_2$ we have $$\Gamma_1 = \Gamma_2 \Rightarrow N_1 L_1 = \frac{N_2 b_2 L_2}{h} \qquad (8)$$

Now let us calculate the ration $D_1/D_\perp$ subject to the condition of Eq. (8). From Eq. (6) and Eq. (7) we have $$\frac{D_1}{D_\perp} = \frac{N_1 \eta_0}{N_2 \eta_{\mathit{eff}}} \frac{b_1 L_1/h}{b_2^3 L_2/h^3} = \frac{N_1 \eta_0}{N_2 \eta_{\mathit{eff}}} \frac{b_1 L_1 h^2}{b_2^3 L_2} \qquad (9)$$

Substituting $N_1 L_1$ from Eq. (8) into Eq. (9) we get $$\frac{D_1}{D_\perp} = \frac{\eta_0}{N_2 \eta_{\mathit{eff}}} \frac{b_1 h^2 N_2 b_2 L_2/h}{b_2^3 L_2} = \frac{\eta_0}{\eta_{\mathit{eff}}} \frac{b_1 h}{b_2^2} \qquad (10)$$

Since $\eta_{\mathit{eff}} \approx \eta_0$ at the normal pressure, the ratio $D_1/D_\perp$ depends on the widths of the area-changed and the air-gap electrodes $b_1$ and $b_2$ respectively and by the electrode gap h and is independent from $N_1$, $N_2$, $L_1$, $L_2$.

If $b_1 = b_2$ and $b_2 >> h$, then $D_∥ << D_⊥$. That is for equal electrode width the area-changed accelerometer has smaller damping than air gap changed accelerometer. That is, however, no longer true if the width of the electrodes became comparable with the distance between the electrodes.

If we assign the typical values for h=1.5 μm and $b_1 = b_2 = 10$ μm, then we get from Eq. (10)

$$\frac{D_1}{D_-} = 0.18. \qquad (11)$$

Thus, in this example the damping coefficient of the area-changed accelerometer is about 5.5 times smaller than the damping coefficient of the air gap accelerometer while providing the same level of capacitive sensitivity Accordingly, the area change type of accelerometers of the disclosed invention can have a smaller mechanical damping than the conventional type that are sensitive to a change in air gap, yet while providing the same level of capacitive sensitivity. Therefore, capacitive accelerometers working on the inventive area-changed principle could have a smaller proof mass than those working on the prior art air-gap principle. Thus, the ability to reduce the proof mass by a factor of about 16 permits the reduction of the size of MEMS accelerometers to the micrometer-scale range.

For an area-change in-plane capacitive accelerometer with complementary metal-oxide-semiconductor (CMOS) readout circuitry, which includes 350 electrodes, a 2 μm gap between electrodes, the mass of the device 3 μg. The estimated device sensitivity is 10 fF/g with total electrode capacitance 0.4 pF. The device has a resonance frequency of 1500 Hz and a mechanical noise floor of 14 μg/$\sqrt{Hz}$. It should be appreciated that for the additional and more preferred embodiments the TNEA is 4.5 μg/$\sqrt{Hz}$.

The damping coefficient was calculated using FEM for the solution of the incompressible Navier-Stokes equation. Capacitance calculations were performed using 3D FEM.

FIG. 3 illustrates an alternative embodiment of the inventive accelerometer in which a plurality of arrays of capacitive plates is deployed.

In the preferred embodiment shown in FIG. 3, the capacitive plates of array 240 are arranged as a plurality of rows extending from opposite sides of the proof mass 120. The rows of capacitive plates in array 240 are mounted on one or more support arms 123. The proof mass frame 120 preferably has an H-shape with the horizontal portions 121 between the vertical legs 122 supporting the first set of arrays of capacitive plates. The vertical legs 122, having a width w which may in this embodiment provide the largest fraction of the proof mass, as opposed to the horizontal portion 122, the capacitive plates 241 and the capacitive plate array supporting arms 123.

The capacitive plates in the device 100 of FIG. 3 are arranged in subgroups of type A and subgroups of type B. In this embodiment, two A type subgroups are deployed A, and A'. Each subgroups consists of an array 241 of capacitive plates attached to the proof mass 120 interlaced with the one of the powered array of capacitive plates attached to the substrates 110 as illustrated in circuit 200 of FIG. 2. In Subgroups A, and A' the arrays 241 of capacitive plates is interlaced with capacitive plate arrays 250. In contrast in each of subgroups B and B' the 241 arrays 241 of capacitive plates are interlaced with capacitive plate arrays 260. Although each of the capacitive plate arrays 250 and 260 are physically attached to the substrate 110 they are electrically isolated for connection to opposite terminals of a power supply to form an equivalent to circuit 200 shown in FIG. 2. While the insulating structures isolating plate arrays 241, 250 and 260 are omitted from the figure for simplicity, it should be understood that when the substrate is electrically conductive, only two of the three plate arrays needs to be insulated therefrom, as the circuit 200 of FIG. 2 may include substrate 110. It should be understood that each subgroup may have more than 2 or 3 capacitive plates and that the device may deploy considerably more than two of each type of subgroup.

Further in the configuration shown in FIG. 3, the proof mass value can be increased by extending the frame width, w, without interference in the movement of the capacitive plates.

In contrast to prior art MEMS based capacitor devices that deploy a variable air gap between capacitive plates, this invention largely eliminates potential stiction between capacitive plates, which leads to lost sensitivity and hysteresis. Other inherent advantages of the novel arrangement of the capacitor plates and proof mass shown in FIGS. 3-11 are that a high capacitor area, for greater sensitivity can be achieved with a relatively small device.

Figure 4:
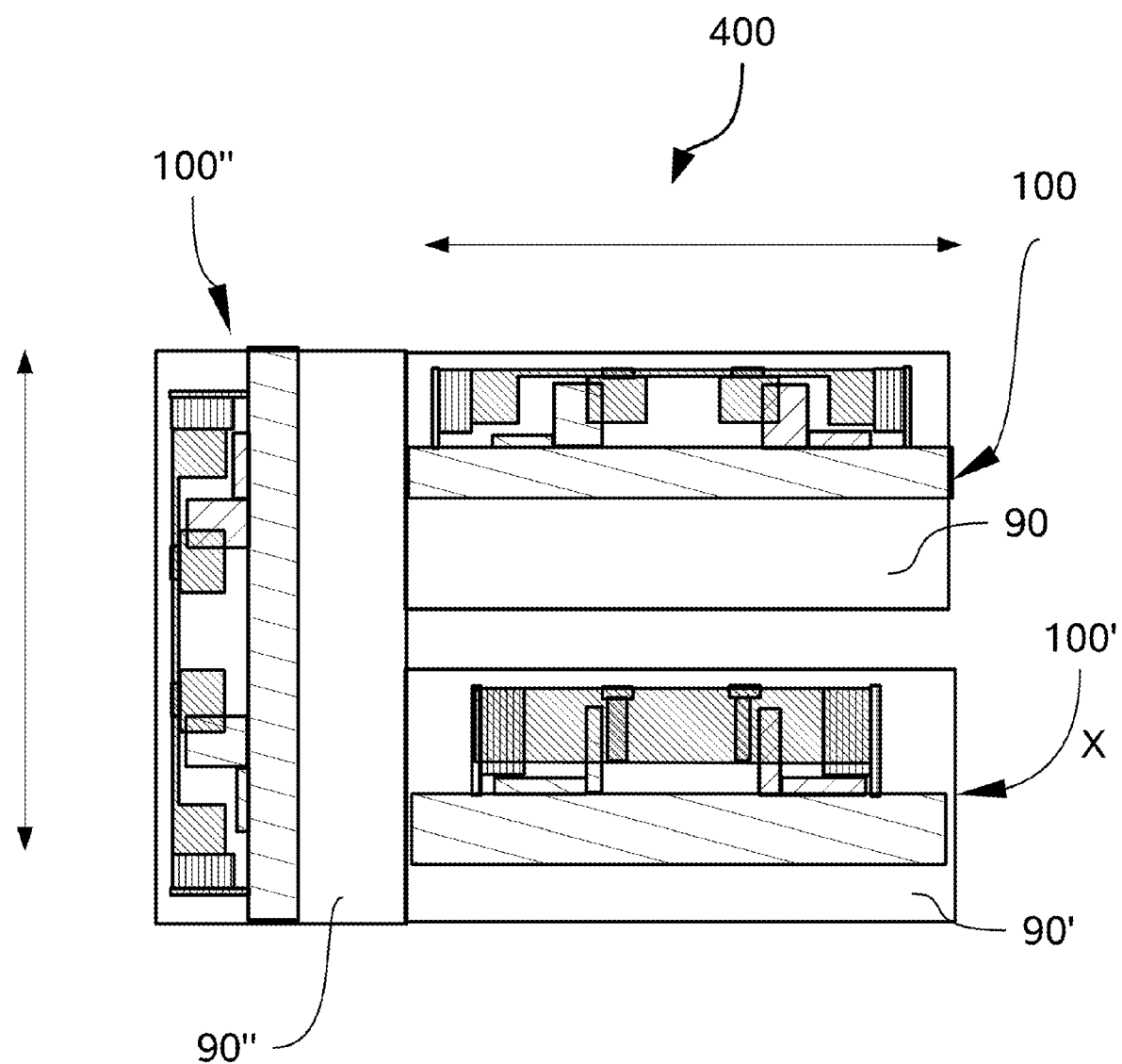
FIG. 4 is a cross section elevation of a three dimensional accelerometer device deploying the accelerometer component shown in FIG. 3.

FIG. 4 illustrates a three dimensional accelerometer 400 assembled from three of the devices 100 of FIG. 3 in a mutually orthogonal arrangement thus forming a three-dimensional accelerometer. Thus each of the three accelerometers 100, 100' and 100" will independently sense movement and acceleration in an axis orthogonal to each of the other two sensors. Further, each of each of the three accelerometers 100, 100' and 100" has its own analog electronics 90, 90' and 90" that includes circuit 200 packaged below substrates 110. In preferred embodiments, the completed device 400 includes digital electronics and in particular a common microprocessor operatively in communication with the analog electronics of each particular accelerometer 100, 100' and 100'". It should be appreciated that the alternative embodiments shown in FIG. 3-11 can be arranged in a like manner.

Figure 5:
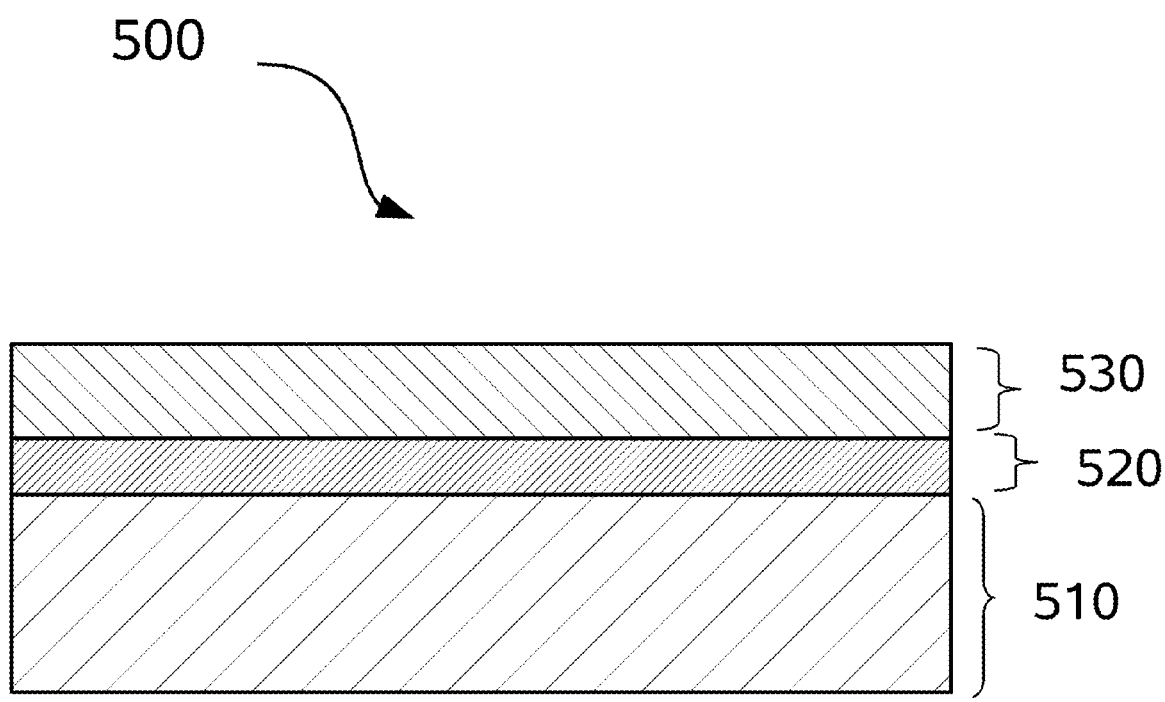
FIG. 5 is a cross-sectional elevation of the SOI structure used to fabricate the accelerometer.

FIG. 5 through FIG. 11 illustrate more preferred embodiments of the invention that are particularly optimized for the intended use of small scale, yet sensitive accelerometers, and methods for their fabrication from SOI (Silicon On Oxide) substrates. FIG. 5 is a cross sectional illustration of the SOI substrate 500 in which a relatively thick Si substrate layer 510 is covered by a layer 520 of dielectric silicon oxide about 2 microns thick. The silicon oxide layer 520 is in turn covered by a layer of n or p doped silicon 530, which is preferable about 45 to 50 microns thick. The lower or handle wafer portion 510 portion of substrate 500 has a thickness of about 350 μm for a total thickness for the SOI substrate 500 of about 400 μm.

Figure 6:
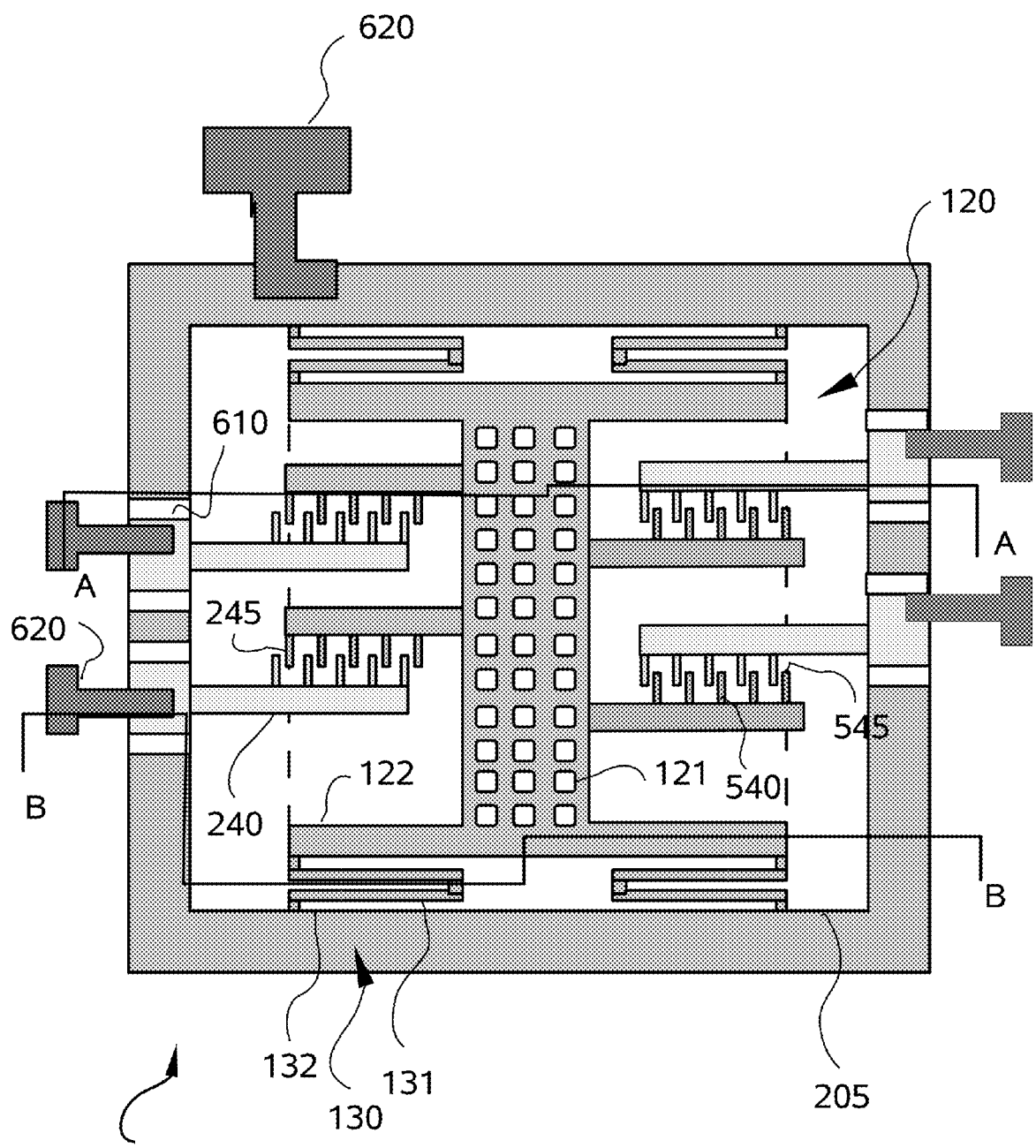
FIG. 6 is a plan view of one embodiment of the accelerometer as fabricated from the SOI in FIG. 5.

FIG. 6 is a plan view of one such embodiment of the accelerator device 100 as fabricated in the SOI substrate 500 in FIG. 5. Generally, a square or rectangular region or frame 205 confines the proof mass 120 that is free of substrate 510 by removal of the silicon oxide layer 520 in this region. The silicon oxide layer 520 is removed by first defining the MEMS device pattern shown in this view by masking and etching layer 510. Once the features shown in the plan view are formed, an etchant that preferably attacks silicon oxide over silicon is used to remove the underlying oxide layer 520, releasing the proof mass as shown in the different sectional view in FIGS. 7 and 8. It should be noted that FIG. 7 corresponds with section reference line A-A to illustrate the static support arms 240 that extend inward form frame 205 and the dynamic support arms 540 that extend out from proof mass 120. In contrast, FIG. 8 corresponds to section reference line B-B in FIG. 6, illustrating the vertical portion 122 of proof mass 120, the central of horizontal portion 121 and spring 130 attached to the side 205a of frame 205. Specifically, the static arms 240 extend in from the side of frame 205 that is orthogonal to the side 205a attached to the springs 130. The frame 205 supports multiple arrays of capacitive plates 245 on support arms 240. The proof mass 120 supports multiple array of capacitive plates 545 on the support arms 540 that extend out from the central portion 121 thereof.

Further, as can be seen in the central portion 121 of proof mass of 120 an array of through holes have been formed that extend to the former location of the silicon oxide layer 520. These holes are formed to permit liquid etchant to reach and thus extract the portion of silicon layer 520 directly beneath the proof mass. Thus, regions of the proof mass 120 are masked to expose a square area of etch holes. Further, at the outer periphery of frame 205 the upper silicon layer 530 in this region is etched down to the silicon oxide layer 520 for electrical isolation of the portion of the support arms 240, as well as other circuit features, that are intended to form separate parts of the capacitive circuit. Thus, various trenches 610 divide the top silicon layer 510. Various conductive traces or metallization layers 620 connect to the isolated silicon region around the frame. These traces can be formed on the silicon oxide 520 layer, or can run over additional dielectric layers that are added for this purpose in the well known method of semiconductor device manufacture. Further, the trenches 610 or portion of upper silicon layer 510 can be filled or cover with a one or more dielectric layer so that the traces 620 can run on these layers.

Figure 7:
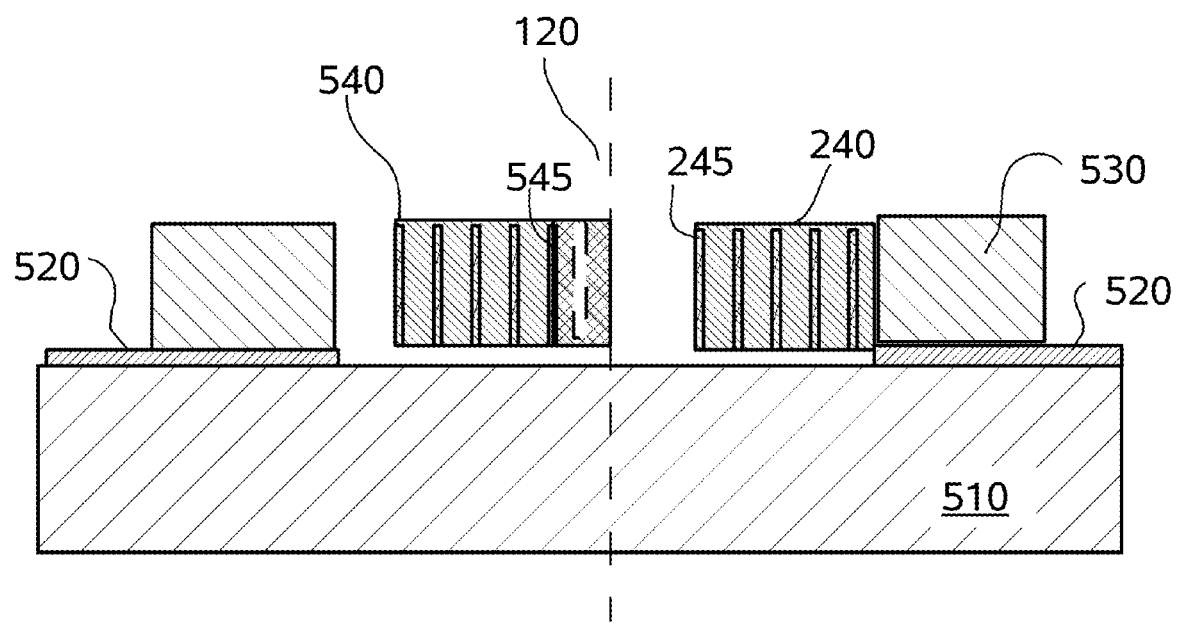
FIG. 7 is a cross-sectional elevation of the accelerometer of FIG. 6 taken a reference line A-A in FIG. 6.
Figure 8:
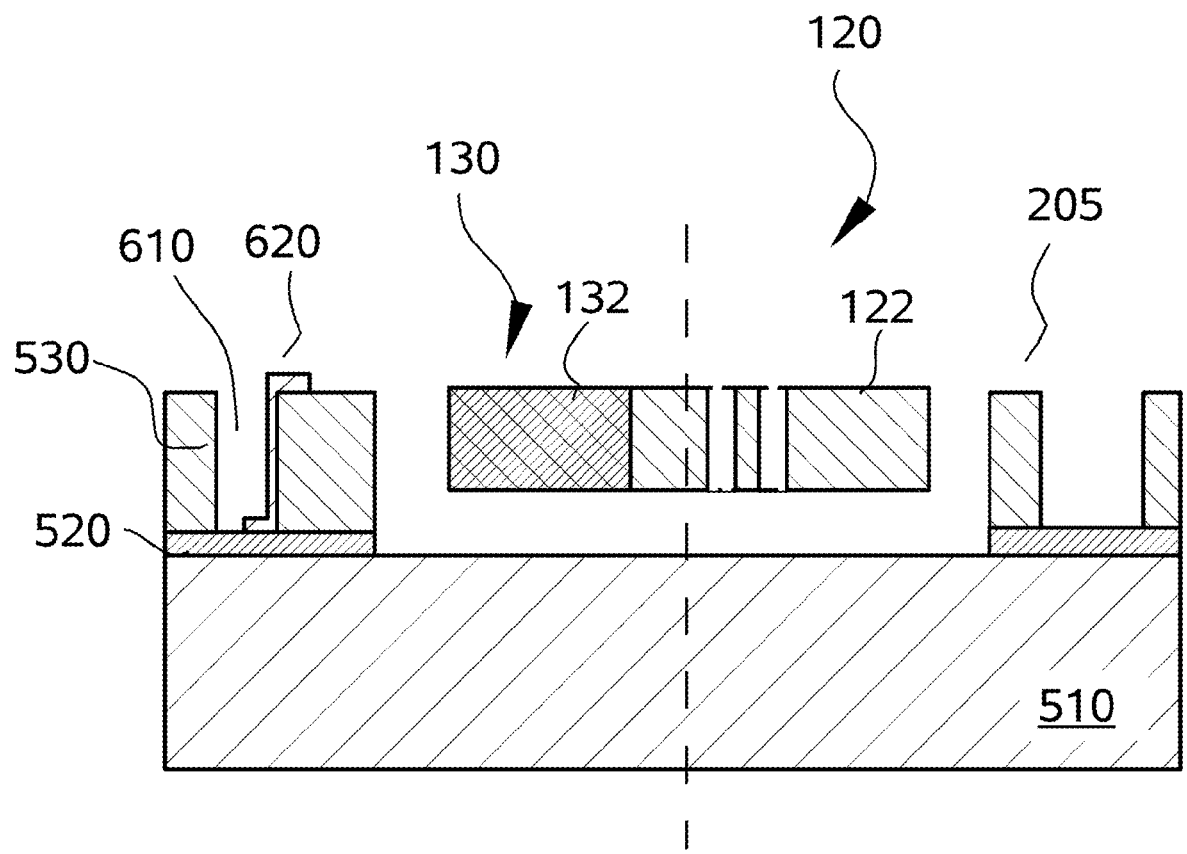
FIG. 8 is a cross-sectional elevation of the accelerometer of FIG. 6 taken a reference line B-B in FIG. 6.
Figure 9A:
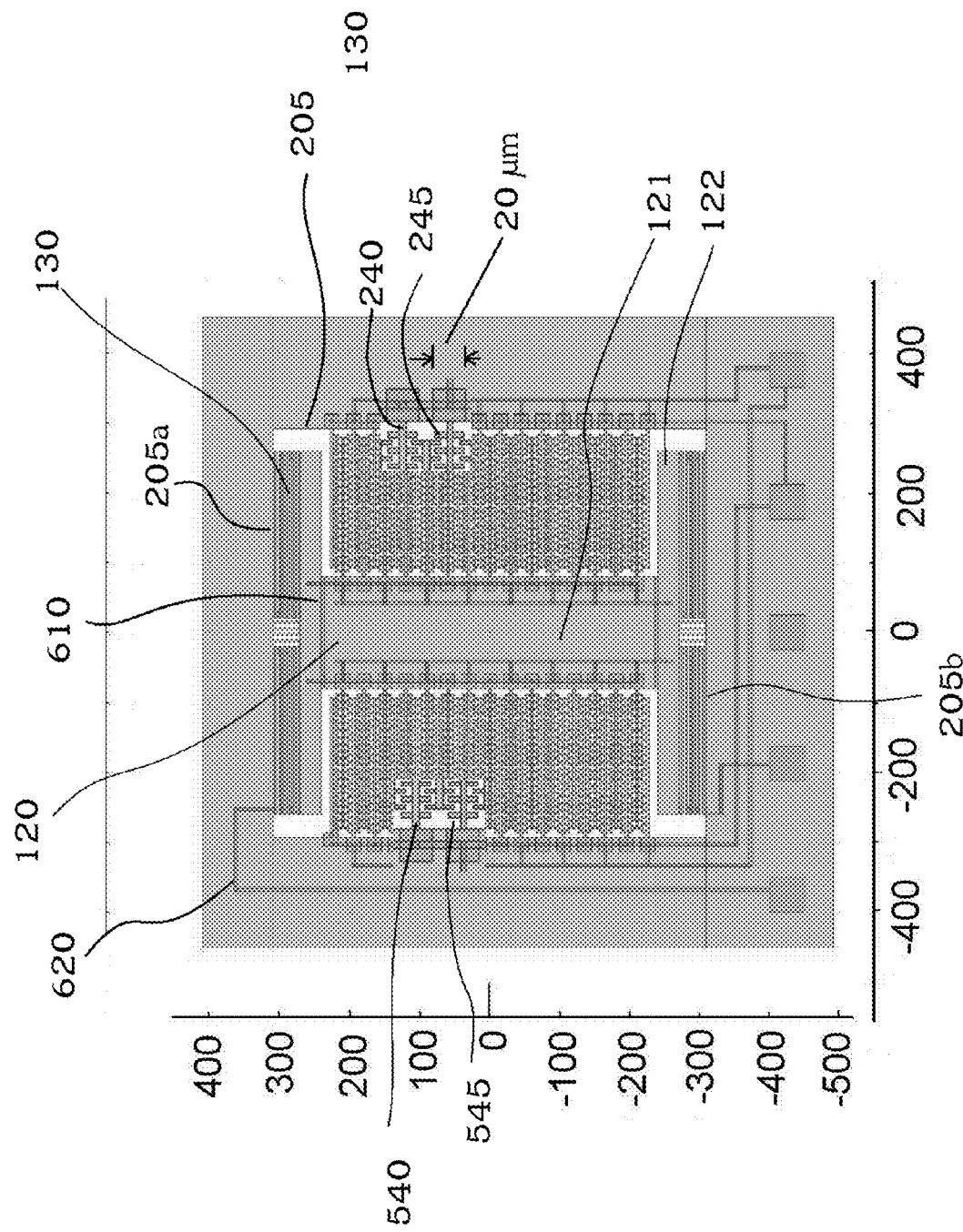
FIG. 9A is a plan view of the moving components and the capacitive circuit in another embodiment of the invention as fabricated from the SOI in FIG. 6, with the scale in microns.

FIG. 9A illustrates in plan view a more preferred embodiment. First it should be noted that while the overall structure of the proof mass is suspended inside the frame as shown in FIGS. 6-8, the central portion of the proof mass is now solid.

It should be appreciated that the proof mass 120 in the embodiment in FIG. 5-8 has reduced mass due to the plural holes created so that etchant can completely remove and release the silicon oxide layer 520. In contrast, the embodiment now shown in FIG. 9-11 has as a first advantage a heavier proof mass for the same area of capacitive plates because such etch holes are avoided. More significantly, as is evident from the sectional view in FIG. 11A the proof mass extends to at least a portion of silicon layer 530 having a solid lower portion 9122, shown in FIG. 11, as well as the upper generally H shaped portion 9121 that suspends the support arms 540 and the dynamic capacitive plates 545 within the central region of frame 205. The lower portion of 9122 was formed in silicon layer 510 by multiple steps of selective etching through a resist mask applied to the lower surface. The perimeter of the frame is etched longer to penetrate closer or the silicon oxide layer 520. The square central portion within this perimeter is etched for a shorter period of time to define the bottom of the proof mass 120. In either this or a separate etch step the silicon oxide layer is penetrated only in the frame region to release the proof mass 120 so that it is only support by springs 130. Thus, as the silicon oxide layer 520 is not intended to etch laterally for release of the proof mass, no perforations are required in it for etching agent flow and reach all of the silicon oxide layer 520. The larger proof mass, relative to the high capacitive plate area reduces the noise floor of the device 100. In addition, the attachment of the additional of proof mass portion 9122 not only permits the increased volume and hence weight of the proof mass but frees up space on the upper surface of the proof mass to fabricate trenches and interconnects circuits that connect different support arms and the associated capacitive plates in a more preferred electrical circuit 1000, shown in FIG. 10.

As shown in the plan view in FIG. 9, the springs 130 also extend in from side 205a of frame 205 where they connect to the vertical sides 122 of "H" shaped proof mass 120. In this embodiment the spring 130 consists from eight beams with a thickness of 3 microns and a length of 240 microns. Height of the springs is 20 μm. As shown in FIG. 11A, the springs 130 are situated proximate the bottom of the device layer containing the capacitive plates 245 and 545. The device layer is etched from layer 510 above for 30 microns and the remaining 20 microns is left for the springs. Preferably the springs 130 are vertical disposed as close as possible to the center of mass of the proof mass structure.

It should be understood that depending on the final application and desired device parameters such as the size and structure of the proof mass modified as known to those with ordinary skill of the art. Likewise, in such cases the spring dimension, and spring constant, change with respect to proof mass and desired sensing range.

It should also be appreciated that the springs 130 can be inset within proof mass 120 such that the proof mass 120 need not have a literal H shape, but can deviate in other ways that are still intended to be within the scope of the claimed invention.

Figure 10B:
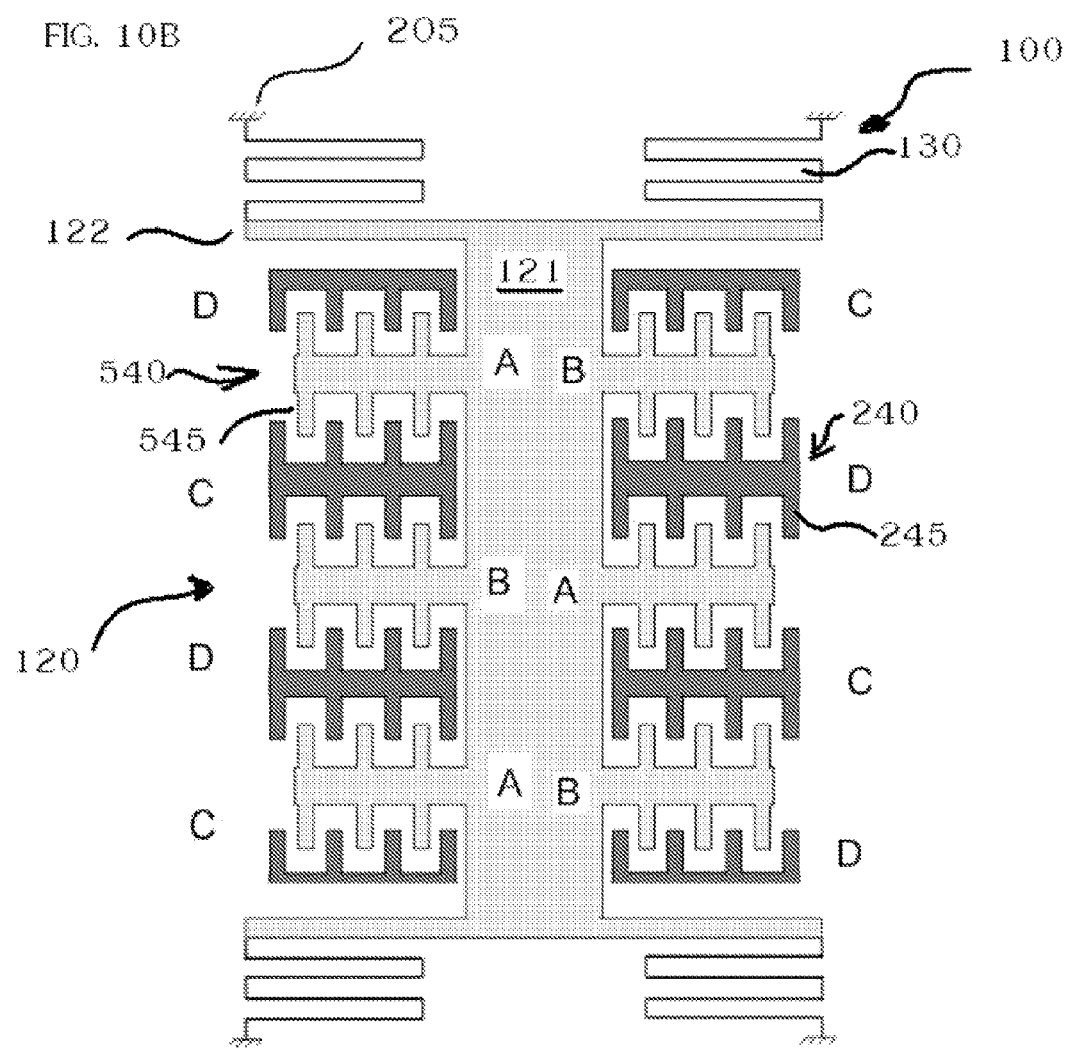
FIG. 10A is a schematic diagram of the function elements of the device in FIG. 9A that correspond to the circuit diagram in FIG. 10B
Figure 10A:
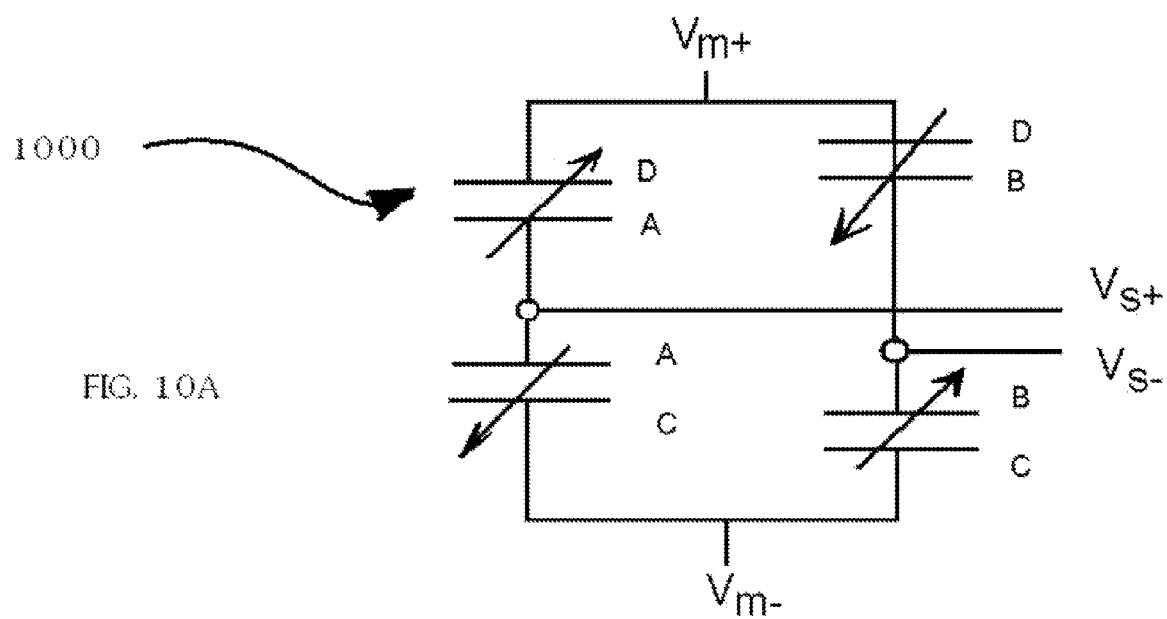
Figure 11B:
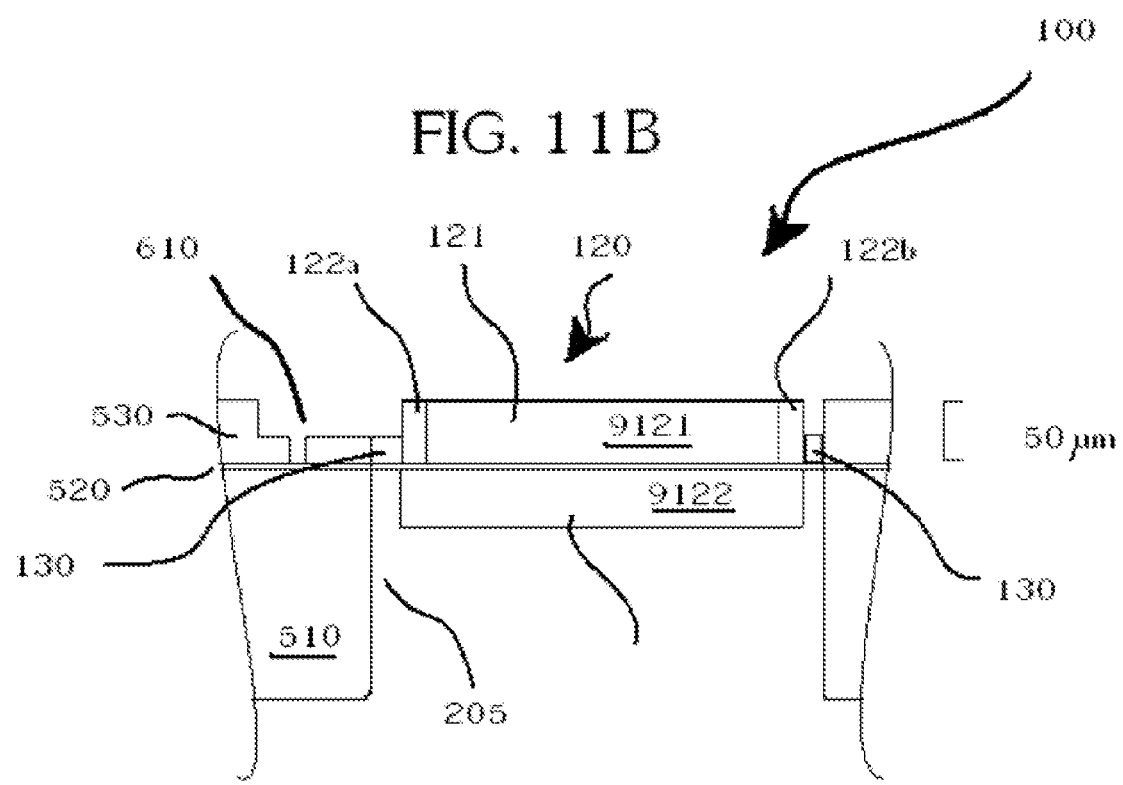
FIG. 11B is a cross-sectional elevation of the accelerometer of FIG. 9 taken a reference line B-B- in FIG. 11A.
Figure 11A:
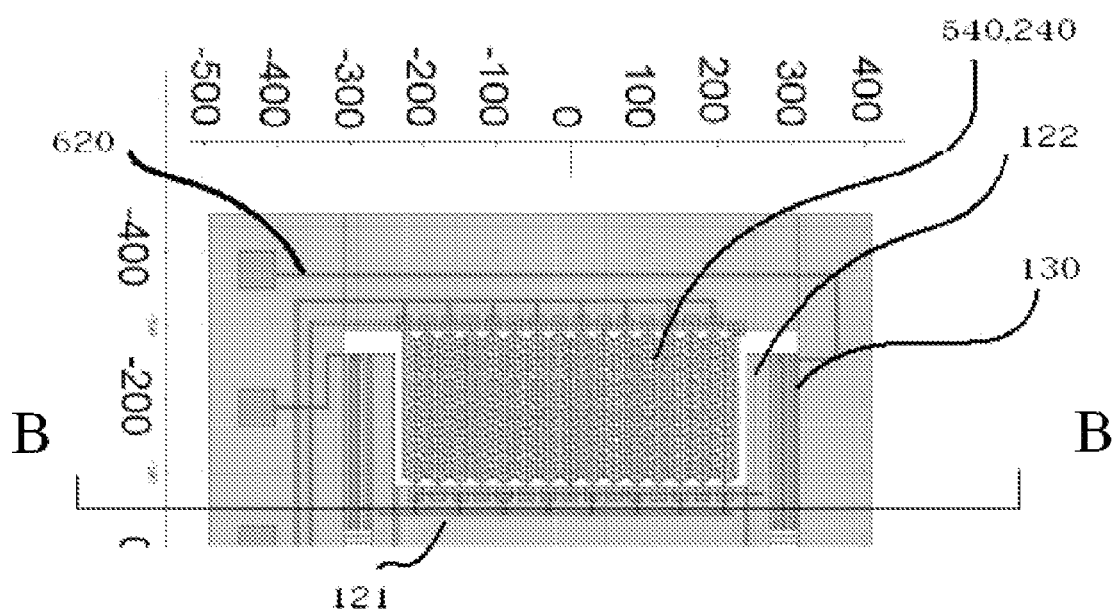
FIG. 11A is a partial plan view of the same device in FIG. 9A with reference line B-B to indicate the position of the portion shown in section in FIG. 11B

Further, while the static and dynamic support arms in the devices 100 of FIG. 6-8 have interlaced capacitive plates that interact largely through an area change, the capacitive plates in device 100 of FIG. 9-11 extend bilaterally from the supports arms, are spaced differently and are connected in a different manner to form the operative device 100 having what is known as a full bridge circuit 1000 illustrated in FIGS. 10A and B. First, it can be appreciated that the preferred arrangement of static support arms 240, the attached capacitive plates 245, the dynamic support arms 540 (which extend out from the proof mass 120, and their attached capacitive plates 545 are disposed centrosymmetrically about the geometric center of the MEMS device as seen in a plan view in FIGS. 6, 9A and 10A. This full bridge circuit 1000 in combination with the centrosymmetric layout has an advantage of canceling offsets stemming from strains and manufacturing errors and some other first order effects on the device, such as temperature, stress and like variations.

As shown in FIGS. 9A and 10A, the proof mass 120 has support arms 540 that are electrically isolated, to form two types of alternating isolated electrodes, indicated A and B, on both sides of the proof mass.

Further, frame 205 now supports two types of alternating support arms 240, indicated as C and D thus the interleaving of each A and B type of capacitive plates 545 with both a C and D type of static capacitive plates 245 defines four types of capacitor pairs from these combinations: A-C, A-D, B-C and B-D. When the proof mass moves upward the capacitance of pairs A-D and B-C increase, whereas pairs A-C and B-D decrease. The equivalent full bridge type circuit 1000 is shown in FIG. 10B. As can be more clearly in FIG. 10A, which is not intended to disclose a particular scale or size, the static capacitive plates 245 now extend orthogonally from support arms 240 bilaterally, that is to opposites sides of support arms 240. It should be noted that the dynamic support arms 540 now also have capacitive plates 545 that extend from both sides. This configuration enables the full bridge circuit but also increases the capacitive area and reduces damping from air resistance.

In this embodiment, as illustrated by the various scale bars in FIG. 9A-E, the open frame 205 is generally square having the dimensions of about 900 μm×900 μm. The static support arms 240 and dynamic support arms 540 have a length of about 200 μm. Gaps between the static and dynamic arms when the proof mass is at rest and when the springs are fully relaxed is about 2.5 μm.

Isolation trenches 610 separate the central portion of the proof mass form the upper and lower spring set. This permits alternating capacitive arms on the proof mass to be connected alternatively to form the full bridge circuit illustrated in FIG. 10B. The structural organization of isolating the bulk of the proof mass 120 below the interlaced capacitive plates 245 and 545 permits a very dense electrode structure without the need to separate the support arms or electrodes as in the other embodiments. Thus, the capacitive sensitivity and other aspects of the electrical performance of the device 100 are significantly enhanced In particular as this structure is free from the effects of large parasitic capacitance that present in the case of two stationary electrodes near one moving electrode (in the proof mass)—as in the case of the embodiment of FIG. 6-8. This permits the fabrication of smaller devices, while keeping our sensitivity and linearity values. It should be appreciated that it is desirable to operate over a linear range.

FIG. 9B-E illustrate the location and size of various stops to prevent planar contact that could lead to stiction either between the springs straight portion 132, or the springs 130, portion of the proof mass 120 and the frame 205. The scale bar surrounding the device is in units of microns. Any enlarged regions have separate scale bars and markings also in micron units. Generally, these stop are protrusion from the planar portions of the spring that would tend to contact each other as well as the proof mass and surrounding frame when the device is accelerated faster than its intended range. These stops prevent large planar area of the device from contacting each other in such circumstances, such contact being likely to lead to sticking of the planar surface. Small size stoppers 135 are added to the fold portion 131 of the springs 130 to avoid stiction between the straight part 132 thereof. Further, another stopper 236 is defined by adjacent channels in the side of frame 205 to prevent stiction of the vertical portion 122 of the proof mass 120 to the frame 205. Further, a series of four protruding fingers 235 extend outward from the side 205a of the frame 205 to prevent the full compression of the springs 130 and the stiction of the long side of the vertical H portion 122 of proof mass 120 with the adjacent frame surface.

As shown on the magnified insets over the left and rights portion of FIG. 9A (with adjacent scale bar for 20 microns) the support arms have a center to center spacing of 30 microns. The capacitive plates on the support arms have a center to center spacing of about 10 microns. As the capacitive plates are about 4 microns thick, this leaves a capacitive gap between adjacent plates of about 2 microns. However, as the plates have a length of about 18 microns, the nominal distance between the edge of each plate and the adjacent root or gap between plates on the adjacent support arm is about 4 microns, only twice the capacitive gap between parallel plates. Thus when the dynamic support arms move up to the 2.4 microns permitted by stops 235, the capacitive plates and support arms can approach as close as 1.6 microns, which is less than the 2 micron gap between parallel capacitive plates. When this occurs the overlapping area between capacitive plates increase from about 2 microns to about 4.5 microns. Considering that the capacitive plates are only about 4 microns wide, a short movement of the proof mass by 2.5 microns increase the capacitive area for each electrode pair from about 2 microns to not just 4.5 microns, but about 8.5 microns, the extra 4 microns being the width of the plates. Thus, reducing the width and spacing of the parallel plates results in a very large collective contribution to the change in capacitance upon the movement of proof mass 120 is via both an area and change and a gap change. It has been discovered that such a hybrid effect from this electrode layout provides enhanced capacitive sensitivity at a low level of noise. More specifically, it is preferred that the capacitive plates be arranged on the support arms such that minimum gap between plates and the support arms is at least half the gap between parallel plates. It is more preferred that the capacitive plates be arranged on the support arms such that minimum gap between plates and the support arms is at least 75% the gap between parallel plates. It is most preferable that the that the capacitive plates be arranged on the support arms such that minimum gap between plates and the support arms is at least equal to the gap between parallel plates.

Figure 12:
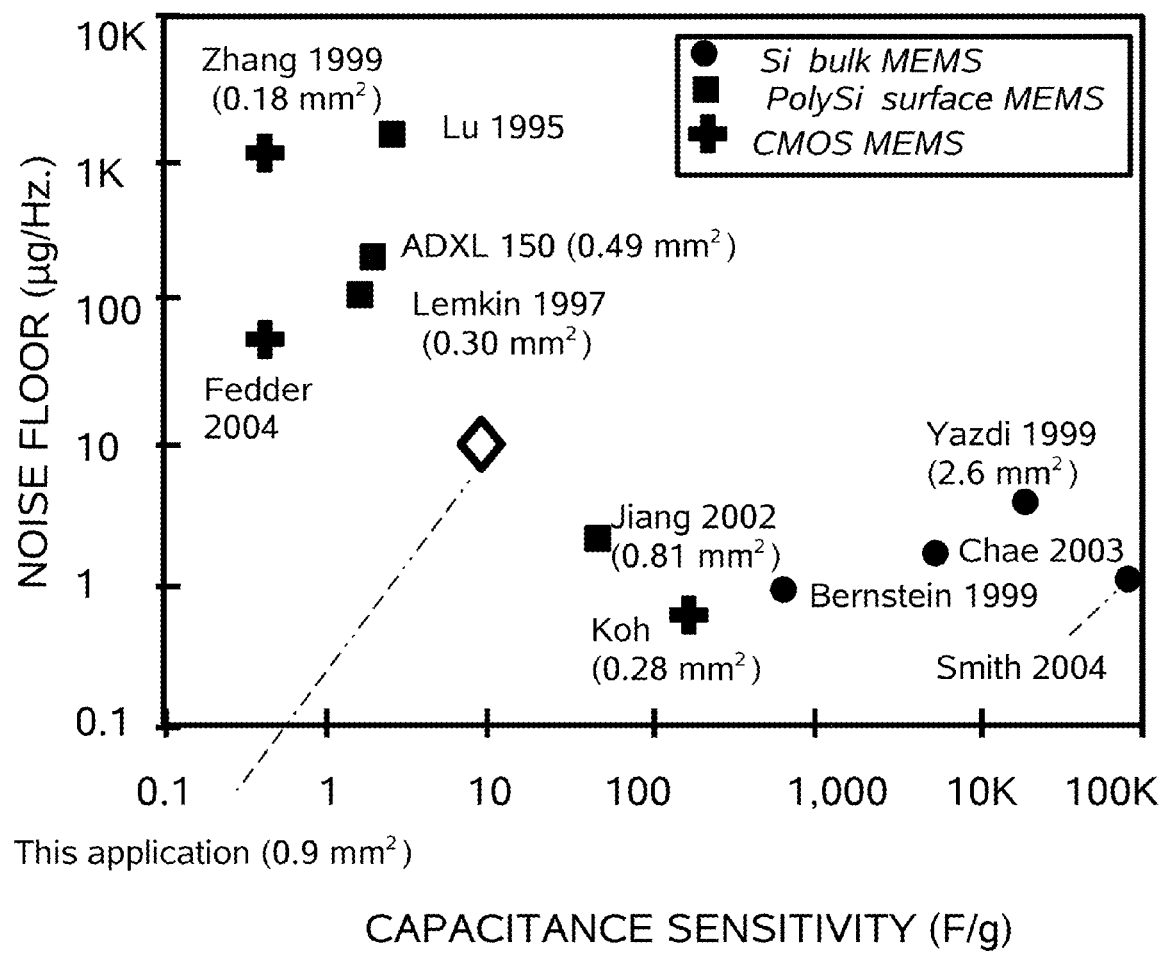
FIG. 12 is a graph comparing the performance of the device in FIG. 9 against alternative devices, not all of which are prior art.

FIG. 12 compares a range of alternative devices, not all of which are prior art, against device 100 of FIG. 9-11 of the present invention. The noise floor and capacitive sensitivity are compared in this X-Y graph to indicated the inherent performance trade offs characteristics of devices that differ from the present invention, which is also on the graph. Although the size or area is not directly plotted it is provided as the area of the MEMS portion of the devices where it could be determined from the publication, as indicated in unit of square millimeters in parenthesis after the authors name. Devices smaller than about 1 mm2 generally have a capacitive sensitivity that is not less than about 50 fF/g Devices that have a lower capacity sensitivity also have a noise floor above about 0.89 µg/√Hz. Further, many of the devices on the plot, other than the present invention, only achieve the stated performance when sealed in a hermetic vacuum package to minimize damping caused by compression of air as the capacitive plates approach each other at close distances. This hermetic package increases the device size substantially. In contrast, the arrangement of capacitive plates in the present invention minimizes such effects substantially so that a vacuum sealed hermetic package is not required.

Although accelerometers with a noise floor of less than 1 µg/√Hz have been reported they include a very large proof mass in the order of several square millimeters. To the best of our knowledge, the noise floor for reported small size accelerometers, that is the MEMS area less than about 1 mm2, exceeds 50 µg/√Hz.

In contrast, the accelerometer of the present application achieves a Capacitive sensitivity (SEN) of 40 fF/g with a Capacitance noise floor 4.5 µg/√Hz. It achieves this level of performance with a sensing element having an area of about 0.9 mm$^2$. This accelerometer 100 fabricated from SOI micromachined capacitive sensing accelerometer with size of the MEMS smaller than 1 mm$^2$. This device is thus mechanical noise limited for IC with input reference noise up to 80 nV/√Hz. The resolution of the sensor is 0.1 mg in 400 Hz bandwidth. Further, the present invention is ideally suited for applications that require small size, high resolution and low power consumption (less than 1 mW).

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:
1. An accelerometer comprising:
 a) a planar substrate having an upper surface and a lower surface,
 b) a proof mass having at least a portion disposed within a principle plane parallel to the plane of the substrate, and further comprising;
  i) at least one support beam disposed parallel to the upper surface of said planar substrate,
  ii) a first plurality of branched electrodes, which comprise;
   (1) a plurality of support arms extending laterally from the at least one support beam,
   (2) a plurality of movable electrode plates distributed along each of the plurality of support arms, the plates being disposed perpendicular to the upper surface of said planar substrate,
 c) a plurality of folded springs coupling said proof mass to said substrate for confining the movement of said proof mass in a plane parallel with the plane of the substrate and in the direction parallel to the plane of the movable electrode plates,
 d) a second and third plurality of branched electrodes coupled to said substrate, each branched electrode comprising;
  i) a plurality of static electrode plates distributed along the branched electrodes, the static electrode plates being disposed parallel and interlaced in capacitive communication with the movable electrode plates and perpendicular to said substrate,
 e) wherein at least two pairs of capacitors are defined by the electrical communication between the static electrode plates on the second and third plurality of branched electrodes and at least a portion of the first plurality of electrodes on said proof mass wherein alternating adjacent branched electrodes on the proof mass are electrically isolated to form a first and second subset.

2. An accelerometer according to claim 1 wherein the alternating adjacent branched electrodes connected to the substrate are electrically isolated to form the second and third plurality of branched electrodes.

3. An accelerometer according to claim 1 wherein the branched electrodes on the proof mass are bilaterally branched such that the moving electrode plates extend in opposite directions from the support arms.

4. An accelerometer according to claim 3 wherein the second and third plurality of branched electrodes are bilaterally branched such that the moving electrode plates extend in opposite directions from the support arms.

5. An accelerometer according to claim 1 wherein the static electrode plates extend up from the substrate and the movable electrode plates extend vertically from at least a portion of the proof mass.

6. An accelerometer according to claim 1 wherein the first and second plurality of branched electrodes extend inward from an open frame formed in the substrate and wherein at least a portion of the proof mass has a portion in the common plane of the first and second plurality of branched electrodes.

7. An accelerometer according to claim 1 wherein the first and second plurality of branched electrodes extend inward from an open frame formed in the substrate and wherein the proof mass comprises;
   a) a first portion in the common plane of the first and second plurality of branched electrodes.
   b) a second portion vertically disposed with respect to the common plane of the first and second plurality of branched electrodes.

8. An accelerometer according to claim 1 wherein the folded spring have protruding stops at the fold portion for limiting spring compression.

9. An accelerometer according to claim 1 wherein the folded spring have outward extending protruding stops to prevent the straight portion of the springs from making contact when the spring is compressed.

10. An accelerometer according to claim 1 the edge of the frame have a plurality of fingers to prevent stiction with portions said proof mass.

11. An accelerometer according to claim 10 wherein said fingers are disposed between the springs.

* * * * *